US008046264B2

(12) United States Patent
Davis et al.

(10) Patent No.: US 8,046,264 B2
(45) Date of Patent: Oct. 25, 2011

(54) DIRECTING POST-SALE SUPPLIES REVENUE TO ORIGINAL DEALER

(75) Inventors: Gary Martin Davis, Rochester, NY (US); David Rocco Arden Campbell, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1212 days.

(21) Appl. No.: 11/741,961

(22) Filed: Apr. 30, 2007

(65) Prior Publication Data

US 2008/0270252 A1 Oct. 30, 2008

(51) Int. Cl.
*G06Q 30/00* (2006.01)
(52) U.S. Cl. ..................................................... 705/26.1
(58) Field of Classification Search .................. 705/26, 705/27, 26.1
See application file for complete search history.

(56) References Cited

U.S. PATENT DOCUMENTS

| | | | |
|---|---|---|---|
| 6,463,421 B2 | 10/2002 | Junger | |
| 6,532,351 B2 | 3/2003 | Richards et al. | |
| 6,798,997 B1 | 9/2004 | Hayward et al. | |
| 6,863,377 B2 | 3/2005 | Walker et al. | |
| 7,013,092 B2 | 3/2006 | Hayward et al. | |
| 7,031,933 B2 | 4/2006 | Harper | |
| 7,043,523 B2 | 5/2006 | Haines et al. | |
| 7,076,449 B2 | 7/2006 | Tsunenari et al. | |
| 7,124,097 B2 | 10/2006 | Claremont et al. | |
| 7,184,973 B2 * | 2/2007 | Monteleone et al. | 705/26.81 |
| 7,599,864 B2 * | 10/2009 | Uchida et al. | 705/26.7 |
| 2003/0139973 A1 * | 7/2003 | Claremont et al. | 705/26 |
| 2005/0197959 A1 | 9/2005 | Sanchez, III | |

* cited by examiner

*Primary Examiner* — Mark Fadok
(74) *Attorney, Agent, or Firm* — Pepper Hamilton LLP

(57) ABSTRACT

A method and system of marketing a consumable may include alerting a customer, via a printer status application, to the status of a consumable in a printing device. A printer identifier may be identified for the printing device via the printer status application. Information about a plurality of product selling entities and associations between each entity and one or more printer identifiers may be maintained in a computer-readable medium. The product selling entity that corresponds to the printer identifier may be determined. The customer may be directed to the product selling entity.

12 Claims, 3 Drawing Sheets

DIRECTING POST-SALE SUPPLIES REVENUE TO ORIGINAL DEALER

BACKGROUND

Printers are common peripheral devices associated with a computer. To function properly, a channel of communication may be established between a printer and a computer. The channel enables a printer to receive commands and information from a computer. Various embodiments provide a printer with a way to communicate with a computer. This communication also allows a printer to communicate with a computer regarding the status of the printer.

U.S. Pat. No. 7,031,933, the disclosure of which is incorporated herein by reference, discloses a process to allow a user to reorder a consumable printing component. However, the user chooses the vendor. The user is not automatically directed to the product-selling entity to purchase a consumable printing component.

U.S. Pat. No. 6,863,377, the disclosure of which is incorporated herein by reference, discloses a reseller identification device which is associated with a printing component. However, the user of the printing component is not directed to order the printing device from the reseller's Internet website.

The disclosure contained herein describes methods of resolving one or more of the problems discussed above.

SUMMARY

In one embodiment, a method of marketing a consumable may include alerting, via a printer status application, a customer to the status of a consumable in a printing device. A printer identifier for the printing device may be identified via the printer status application. Information about a plurality of product selling entities and associations between each product selling entity and one or more printer identifiers may be maintained in a computer-readable storage medium. The product selling entity which corresponds to the identified printer identifier may be determined. The customer may be directed to the corresponding product selling entity.

In one embodiment, the plurality of product selling entities which sold the printing device may be determined. Optionally, the product selling entity may be determined only if a request to order the consumable is received from the customer. In one embodiment, prior to the alerting, the printer status application may be used to obtain status information about the printing device. In one embodiment, directing the customer to the corresponding product selling entity may include delivering, to the customer via an electronic communication, information about the corresponding product selling entity. Information about the corresponding product selling entity may include a website of the product selling entity. Information about the corresponding product selling entity may also include consumables sold by the product selling entity.

In one embodiment, the printer identifier may include a device identifier, wherein the device identifier comprises a code from the printing device. The code from the printing device may include, but is not limited to, a serial number, a model number, and a Universal Product Code. The printer identifier may also include a consumable identifier, wherein the consumable identifier comprises a code from the consumable in the printing device.

In one embodiment, by automatically accessing the product selling entity and the printer identifier through a communication network, it may be determined which of the plurality of product selling entities corresponds to the identified printer identifier. A selection of a product selling entities may be displayed to the customer if the printer identifier does not correspond to any of the known product selling entities.

In one embodiment, a method may include alerting a customer on a computing device to the status of a consumable in a printing device. A printer identifier may be identified for the printing device. Information may be maintained in a computer-readable storage medium, about a plurality of product selling entities and associations between each entity and one or more printer identifiers. The product selling entity which corresponds to the identified printer identifier may be automatically determined. The customer may be directed to an electronic storefront of the corresponding product selling entity.

In one embodiment, the product selling entity's electronic storefront may include an Internet protocol address which includes the printer identifier. The plurality of product selling entities may be identified which sold the printing device. In one embodiment, the plurality of product selling entities may be automatically determined only if a request to order the consumable is received from the customer.

In one embodiment, the printer identifier may include a device identifier, wherein the device identifier comprises a code from the printing device. The printer identifier may also include a consumable identifier, wherein the consumable identifier comprises a code from the consumable in the printing device.

In one embodiment, a system may include a printing device that may have an associated printer identifier. A computer-readable storage medium may maintain information about a plurality of product selling entities and associations between each product selling entity and one or more printer identifiers. A server may determine which of the plurality of product selling entities corresponds to the associated printer identifier and may direct a customer to the product selling entity corresponding to the associated printer identifier. In one embodiment, a printer status application may alert a customer as to the status of a consumable in the printing device.

DETAILED DESCRIPTION

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art.

Figure 1:
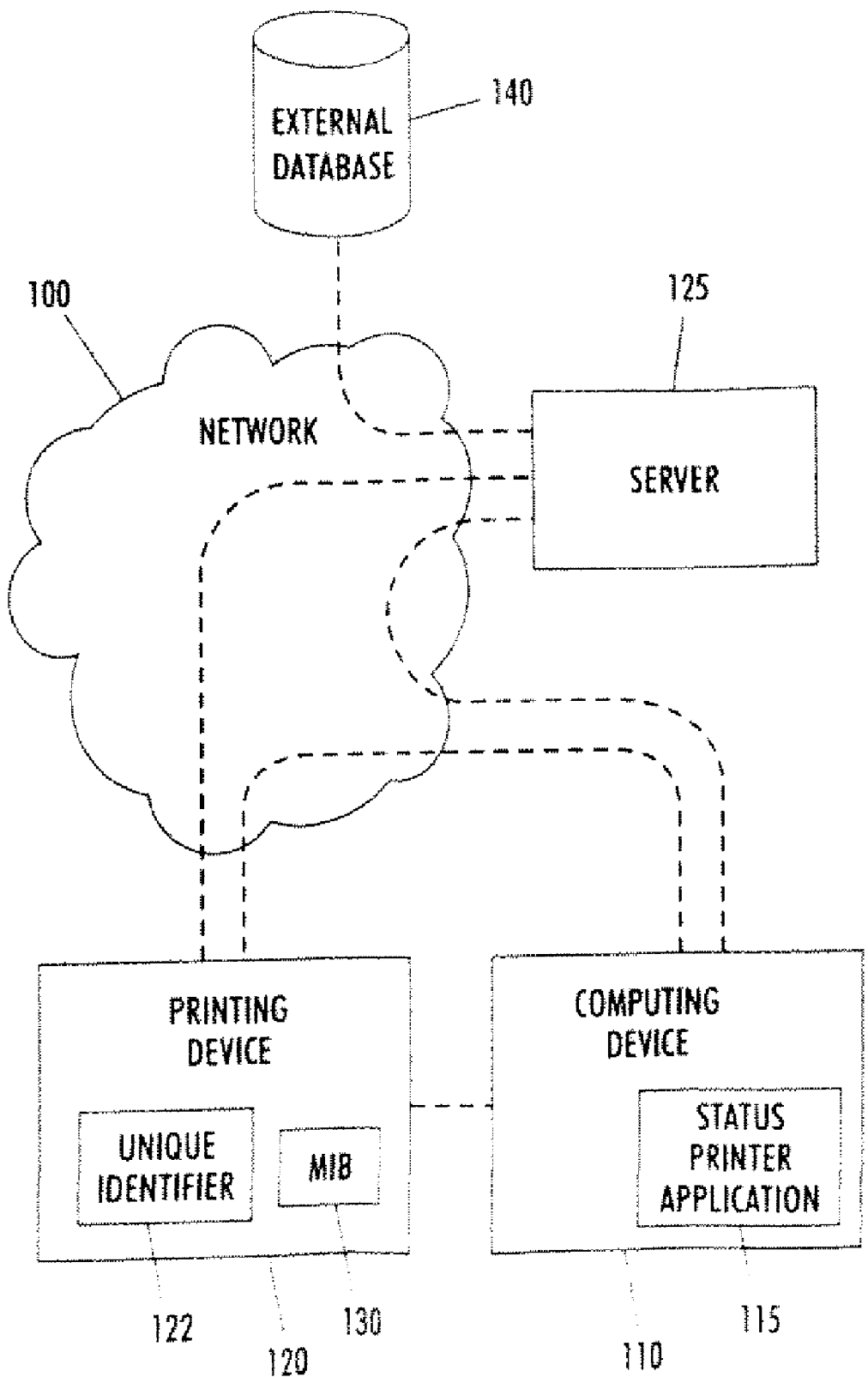
FIG. 1 depicts one embodiment of a post-sale supply revenue system.

As depicted in FIG. 1, one or more printing devices 120 may be in communication with one or more computing devices 110 via a network 100 such as a local area network (LAN), wide area network (WAN), Internet or another communications network. The computing device 110 may, in some embodiments, be connected to the printing device 120 via multiple communications networks. In one embodiment a printing device 120 can be connected to a computing device 110 via a wireless network. Alternatively, a printing device 120 can be connected to a computing device 110 via a wired device such as, but not limited to, a universal serial bus (USB) port or outlet, or other non-wireless device. As used herein, the words "connected" and "connection" refers to devices that are configured for one or more wired and/or wireless networks so that they can pass information to each other through the network.

In one embodiment, a customer may be associated with one or more computing devices 110. A customer may be a single user or a customer may be multiple users. A computing device 110 may include, but is not limited to, a computer, a cell phone, a personal digital assistant, a gaming system, and/or another device capable of communicating in a networked environment. A networked computing device 110 may be associated with one or more printing devices 120.

A printing device 120 is an electronic device that is capable of receiving commands and printing text and/or images on a substrate. A printing device 120 may include, but is not limited to, a printer, a copier, a fax, a scanner, and/or another device using ink or toner. As used herein, the words ink and toner are used interchangeably to refer to wet or dry material that form an image or text on a substrate. A printing device 120 may also contain a combination of functions.

A printer identifier 122 may be associated with each printing device 120. The printer identifier may be a numeric number, a letter, a symbol, a combination of these items, or another displayable image. The printer identifier 122 includes a device identifier. A printer identifier may also include a consumable identifier. A device identifier identities a type and/or brand of a printing device. The device identifier may include, but is not limited to, a serial number, a model number, a Universal Product Code (UPC), and/or other identifying codes. A consumable identifier identifies a replaceable product in the printing device. The consumable identifier may be included in the printer identifier or it may be separate. A consumable or replaceable product in a printing devices, may include, but is not limited to, a toner cartridge, a black ink cartridge, a color ink cartridge, a print head, and/or paper. For example, consumable identifier 002 may identify a black ink cartridge.

In one embodiment, if a printer identifier includes both a device identifier and a consumable identifier, a printing device may have more than one consumable identifier. For example, the printing device may have a different consumable identifier each time the printing device needs a different consumable.

A printer identifier 122 may be used to determine a product selling entity. A product selling entity is a vendor of a consumable. In one embodiment, a product selling entity may be the entity that sold the printing device. In another embodiment, the product selling entity may be affiliated with the entity that sold the printing device. Alternatively, the product selling entity may not be related to the entity that sold the printing device. For example, a product selling entity may have bought a printing device from the original equipment manufacturer and sold the device to the public.

Figure 2:
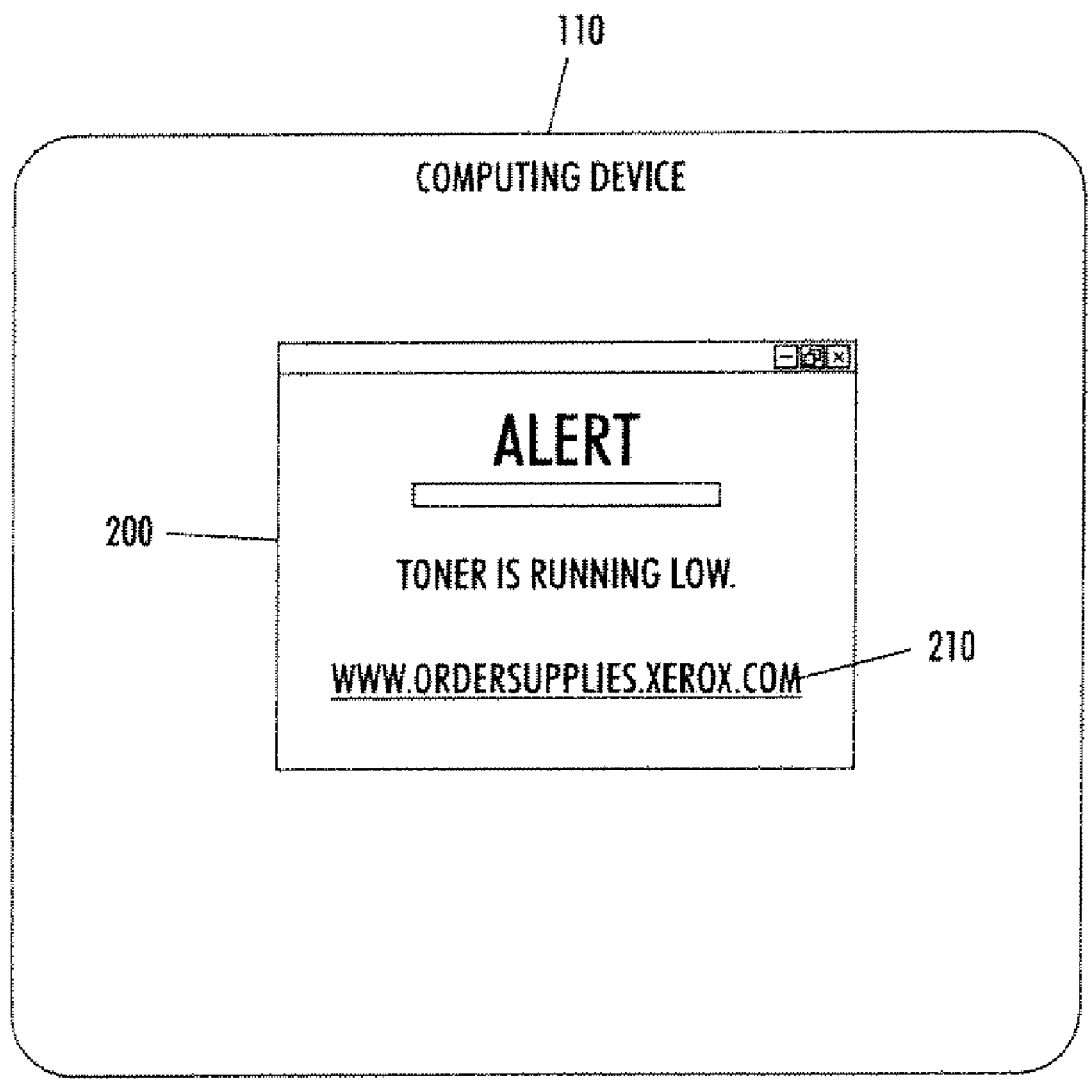
FIG. 2 depicts one embodiment of an alert on a computing device.

In one embodiment, a customer of a computing device may receive an alert regarding the status of a consumable in a printing device. FIG. 2 depicts one embodiment of an alert. An alert 200 is a type of message transmitted to a computing device regarding the status of a device. An alert may occur when a printing device needs more of a particular consumable.

An alert 200 may appear on a customer's computing device 110. In one embodiment, an alert may appear as a display on the computing screen. In another embodiment, an alert may be an icon, an e-mail, a text message, a pop-up window, and/or another electronic display. Alternatively, an alert may include a noise from a computing device. In another embodiment, an alert may be printed or displayed by a customer's printing device. In one embodiment, an alert may appear on all computing devices connected to a printing device. Alternatively, an alert may appear only on the computing device of an administrator who purchases the supplies.

Referring back to FIG. 1, a printer status application 115 may determine when to provide instructions to transmit an alert. A printer status application 115 may reside within a computing device 110. The computing device 110 may communicate with the printing device 120 via the printer status application software 115. In one embodiment, the printer status application 115 may be part of the printing device software installed in a computing device 110 when a customer first establishes a connection with the printing device 120. In another embodiment, the printer status application 115 may be a separate piece of hardware installed on the computing device 110. In one embodiment, the printer status application 115 and the printer driver may be installed on a computing device 110 simultaneously.

The printer status application 115 may communicate with a printing device at predetermined or random times. In one embodiment, the printer status application 115 may check for an alert in the printing device 120 and may direct that an action be taken in response to the alert. In one embodiment, the printer status application 115 may wait for certain events from the printing device 120 to occur before an alert notifies a customer. In an embodiment, the event may be a detection of a particular level of a printing device consumable. For example, the printer status application may instruct the computing device 110 to create an alert when the ink is two-thirds empty. In one embodiment, a printer identifier 122 which includes a consumable identifier may be sent to the computing device 110 to create the alert. In another embodiment, the consumable identifier may be sent separately to the computing device 110. The consumable identifier may be used by the alert to inform a customer of the needed consumable (i.e., toner is low). In one embodiment, the printer status application 115 may instruct the computing device 110 to display an alert message at specific consumable levels, at a certain time, and/or when other benchmarks are satisfied.

In one embodiment, a printer status application 115 may access dynamic link libraries (DLLs) when communicating with a printing device 120. DLLs may allow a printer status application 115 to access information such as, but not limited to, the country of use. The country of use is the country where the printing device is located. In one embodiment, the country of use may also be included in the printer identifier 122. In another embodiment, the country of use could be a separate identifier received by the computing device 110 from the printing device 120 using DLLs. Determining the printing device's country of use may be necessary for displaying the alert as printing devices may be used in a variety of countries. The alert may need to be displayed in a variety of different languages. The computing device 110 may communicate with the printing device 120 using DLLs to determine the language needed for the alert.

Referring to FIG. 2, in one embodiment, an alert may include instructions to enable a customer to order a consumable. In one embodiment, an alert may display a navigation element 210 to an electronic storefront when the navigation element is selected by the user. An electronic storefront is an online retail location where commerce is transacted electronically over a communication network. An electronic storefront may include, but is not limited to, a website or webpage. Alternatively, the navigation element may display a different type of electronic document. The navigation element may be associated with a software application that displays text, images, and other information located on the Internet. The navigation element may be, but is not limited to, a hyperlink, an electronic input device, or an image that connects to a display on the Internet. In one embodiment, the alert may display a hyperlink which may open a browser window to the Internet. In one embodiment, the navigation element may become more prominent as the consumable supply diminishes in the printing device.

In one embodiment, a customer may decide to close or ignore an alert. In another embodiment, a customer may choose to order a consumable and a computing device may communicate with a printing device. The computing device may obtain the printer identifier of the printing device if not previously determined.

Referring back to FIG. 1, a printing device 120 may communicate with a computing device 110 to obtain a printing device's printer identifier 122. In one embodiment, a printer identifier may include only a device identifier. In another embodiment, a printer identifier may include a device identifier and a consumable identifier. A computing device 110 may access a server 125 via a communication network 100. The server 125 may communicate with an external database 140 and/or a management information base (MIB) 130. An external database 140 and a MIB 130 are both organized collections of information stored in a computer-readable storage medium, such as but not limited to, a list, table or database. Some or all of the external database 140 and/or the MIB 130 may reside independently, with a server, with a printing device, with a computing device, or in various other embodiments. Some or all of the external database 140 and/or the MIB 130 may reside within any of the devices 110, 120, 125. The external database 140 and/or the MIB 130 may include printer identifiers and each printer identifier may be associated with a product selling entity. In one embodiment, there may be many printer identifiers associated with a single product selling entity. The external database 140 and/or the MIB 130 may be searched to obtain the product selling entity associated with a particular printer identifier 122. Product selling entity information including, but not limited to, location, phone number, and an Internet protocol address (Internet address) may be returned by the external database 14 and/or the MIB 130. In one embodiment, a product selling entity information may include an Internet address to buy the consumable associated with the alert message for the particular type of printing device. In one embodiment, product selling entity information, such as the electronic storefront information, may be added to the external database 140 and/or the MIB 130 at any time. In one embodiment, the information may be included simultaneously with the printer identifier information. In an alternative embodiment, the product selling entity information may be added at a different time such as, but not limited to, the time of shipment and the time of delivery.

In one embodiment, the product selling entity information may be passed to the server 125 from the external database 140 and/or the MIB 130. The server 125 may communicate with the computing device to display the product selling entity's website and allow a customer of the computing device 110 to purchase the consumable. In one embodiment, the Internet address may contain the printer identifier. In one embodiment, the Internet address may contain some portion of the printer identifier. In one embodiment, the printer identifier may be associated with the product selling entity's homepage and the homepage may be displayed. In another embodiment, the printer identifier may include both the device identifier and the consumable identifier in order to display the particular consumable from the product selling entity's website. In another embodiment, the customer need not view the product selling entity's website and instead the consumable may be automatically ordered and the customer may receive a delivery confirmation receipt. In another embodiment, the product selling entity may not have an Internet address and the customer may receive the product selling entity's contact information, such as, but not limited to, address and phone number.

In one embodiment, a customer may only access the product selling entity's Internet address if the customer responds to the alert message. In one embodiment, the customer may respond to an alert message by a mouse click. In one embodiment, the customer may first view the manufacturer's website and may then be redirected to the product selling entity's website after the product selling entity's information is obtained from the MIB and/or the external database. In another embodiment, the product selling entity's website may appear even if the user does not click on the alert message. Alternatively, the product selling entity's website or entity information may be displayed on the computing device instead of an alert message.

Figure 3:
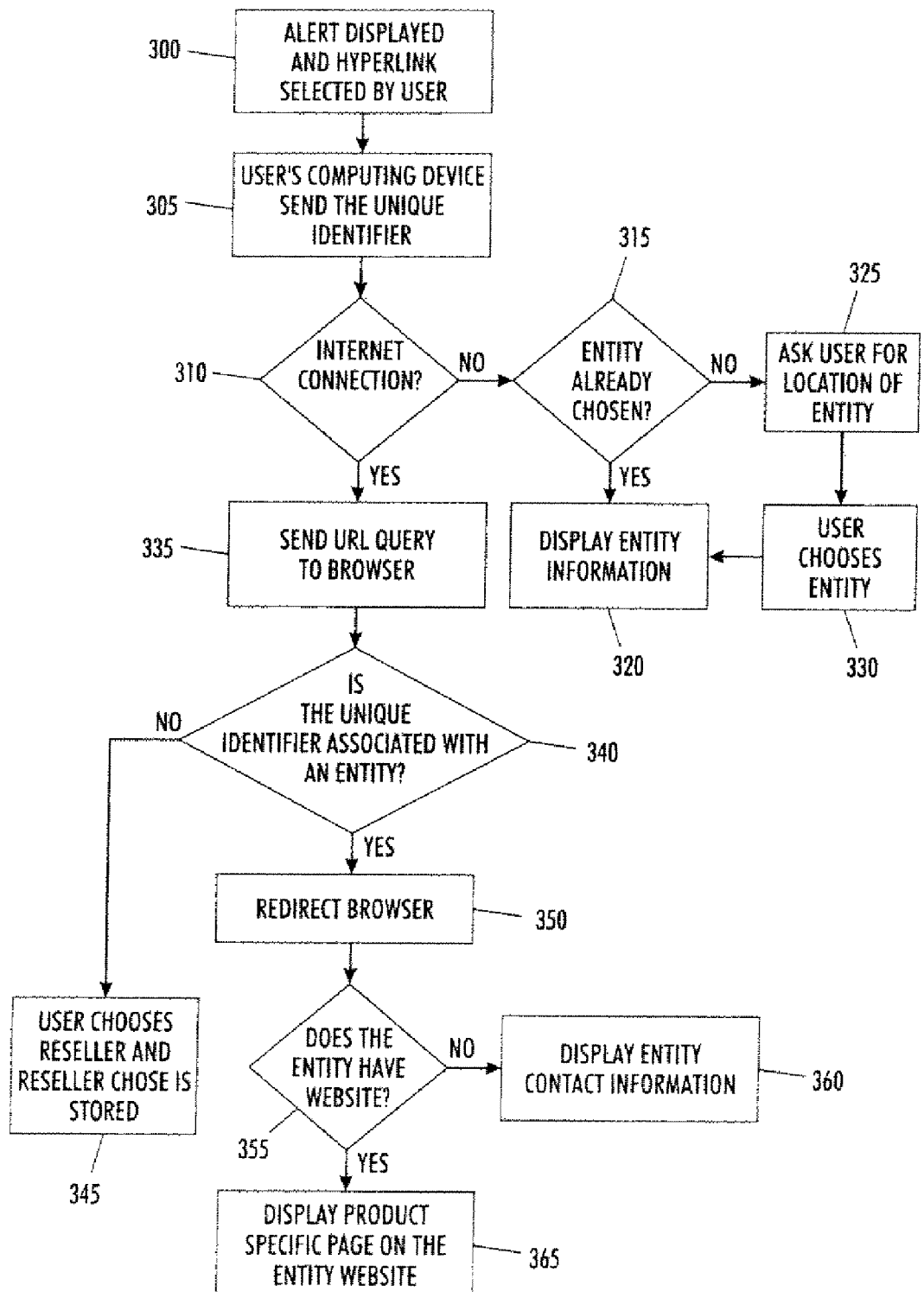
FIG. 3 depicts a flowchart describing one embodiment of a product selling entity sales method.

FIG. 3 depicts a flowchart of one embodiment of a product selling entity sales method. An alert may appear on a customer's computing device to inform the customer that a consumable is needed. The alert may display a navigation element that is enabled by the customer 300. In one embodiment, the computing device may have already obtained a printer identifier which includes the consumable identifier and the device identifier. In another embodiment, the computing device has only obtained the consumable identifier and must communicate with the printing device to obtain the printer identifier with the device identifier. After the computing device obtains the printer identifier, the computing device may send the printer identifier to a server 305. The server can transmit the printer identifier to the external database and/or the MIB 305 if there is a connection to the Internet 310.

If the computing device is not connected to the Internet, but a product selling entity was previously chosen 315, the customer may receive the entity's contact information 320. The product selling entity contact information may include, but is not limited to, the address, an order form, and/or the entity's consumables.

Alternatively, if the product selling entity was not previously chosen by the customer 315, the customer may choose a product selling entity with whom they want to purchase the consumable. In one embodiment, the customer may select an entity from a group of pre-selected entities. In a further embodiment, the entities may be pre-selected based on the customer's location 325. The entity may be any entity that sells the needed consumable or it may be an entity that sells the printing device and the consumable. After a customer selects a product selling entity 330, the product selling entity's contact information may be displayed for the customer. The product selling entity chosen for the customer's particular printing device may be stored in a local computer-readable storage medium and associated with the printing device's printer identifier.

Alternatively, a customer's computing device may be connected to the Internet 335 and a browser may open on the customer's computing device. In one embodiment, the browser may open automatically. In another embodiment, the customer may open the browser. In one embodiment, the original manufacturer's website may be displayed on the customer's computing device. In another embodiment, the customer may choose what to display or there may be a default display.

If there is an Internet connection, a server may search the external database and/or the MIB to determine if there is a printer identifier associated with a product selling entity 340. If there is no product selling entity associated with the printer identifier in the MIB and/or the external database, then the customer may be asked, via the browser or other Internet display, to choose a product selling entity. A product selling entity may be chosen, as discussed above, by a customer picking an entity or through a pre-selected set. After the customer chooses a product selling entity, the entity may be associated with the printer identifier and may be saved to the external database and/or the MIB 345.

If the server associates the printer identifier with a product selling entity 340, then the browser may be redirected 350. If the product selling entity has no website 355, then the product selling entity information may be displayed 360. The product selling entity's information may be received from the external database and/or MIB and displayed on a website, such as, but not limited to, the manufacturer's website.

If the product selling entity has a website 355, the customer may be directed to the entity's website. In one embodiment, based on the printer identifier, the customer may be connected to a marketplace displaying the product selling entity's name and address. Alternatively, the customer may be directed to a webpage of the product selling entity where the customer can order the consumable 365. In one embodiment, if the printer identifier includes the device identifier and the consumable identifier, then the customer may be connected to a consumable-specific webpage of the product selling entity where the customer can order the consumable for their particular printing device. The webpage may include the specific consumable that is needed for the customer's printing device. Alternatively the Internet address may be a webpage of the product selling entity that displays the customer's printing device model.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of marketing a consumable comprising:
    displaying an alert, via a printer status application, to a customer, wherein the alert comprises a status of a consumable in a printing device and a navigation element;
    identifying, via the printer status application, a printer identifier for the printing device;
    maintaining, in a computer-readable storage medium, information about a plurality of product selling entities and associations between each product selling entity and one or more printer identifiers;
    in response to receiving a selection of the navigation element by the customer:
        determining whether the printer identifier is associated with a product selling entity by accessing the computer-readable storage medium,
        in response to the printer identifier being associated with a product selling entity, automatically displaying a webpage associated with the product selling entity,
        in response to the printer identifier not being associated with a product selling entity:
            receiving a selection of a product selling entity from the customer;
            associating the selected product selling entity with the printer identifier, and
            storing the association in the computer-readable storage medium.

2. The method of claim 1, wherein the determining comprises determining which of the plurality of product selling entities sold the printing device.

3. The method of claim 1, further comprising, prior to the displaying an alert, using the printer status application to obtain status information about the printing device.

4. The method of claim 1, wherein the webpage comprises information about consumables sold by the product selling entity.

5. The method of claim 1, wherein the printer identifier comprises a device identifier, wherein the device identifier comprises a code from the printing device.

6. The method of claim 5, wherein the code from the printing device comprises one or more of the following: a serial number, model number, and a Universal Product Code.

7. The method of claim 5, wherein the printer identifier comprises a consumable identifier, wherein the consumable identifier comprises a code from the consumable in the printing device.

8. The method of claim 1, wherein determining whether the printer identifier is associated with a product selling entity comprises automatically accessing, through a communication network, the product selling entity and the printer identifier from the computer-readable storage medium.

9. The method of claim 1, further comprising, in response to the printer identifier not being associated with a product selling entity, displaying a selection of a product selling entities to the customer.

10. The method of claim 1, wherein displaying an alert comprises displaying an alert in response to a level of the consumable reaching a threshold level.

11. The method of claim 1, further comprising determining a country in which the print device is being used, wherein displaying an alert comprises displaying an alert in a language associated with the country.

12. The method of claim 11, wherein determining a country comprises accessing the country from one or more dynamic link libraries.

* * * * *